(12) United States Patent
Murakami et al.

(10) Patent No.: US 9,046,903 B2
(45) Date of Patent: Jun. 2, 2015

(54) CONTROLLER

(71) Applicant: Renesas Electronics Corporation, Kawasaki-shi, Kanagawa (JP)

(72) Inventors: Hiroshi Murakami, Itami (JP); Yukihiko Yamaguchi, Itami (JP); Takuya Makise, Itami (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 210 days.

(21) Appl. No.: 13/686,457

(22) Filed: Nov. 27, 2012

(65) Prior Publication Data

US 2013/0134959 A1 May 30, 2013

(30) Foreign Application Priority Data

Nov. 30, 2011 (JP) ................................. 2011-261656

(51) Int. Cl.
*G11C 5/14* (2006.01)
*G05F 3/02* (2006.01)
*H02M 3/158* (2006.01)

(52) U.S. Cl.
CPC ............... *G05F 3/02* (2013.01); *H02M 3/1584* (2013.01)

(58) Field of Classification Search
USPC ................. 323/225, 234, 270, 277, 282–290, 323/311–315; 307/29, 48, 50, 53, 60, 86, 307/64; 365/189.09, 189, 7, 189.11
See application file for complete search history.

(56) References Cited

U.S. PATENT DOCUMENTS

| 7,373,527 | B2 * | 5/2008 | Chapuis ......................... 713/300 |
| 7,646,382 | B2 * | 1/2010 | Chapuis et al. ................ 345/211 |
| 8,154,315 | B2 * | 4/2012 | Henson et al. ............ 324/754.01 |
| 8,284,619 | B2 * | 10/2012 | Nakakubo ................. 365/189.09 |
| 2007/0247124 | A1 | 10/2007 | Mihashi |

FOREIGN PATENT DOCUMENTS

JP          2007-288974 A      11/2007

* cited by examiner

*Primary Examiner* — Rajnikant Patel
(74) *Attorney, Agent, or Firm* — McDermott Will & Emery LLP

(57) ABSTRACT

The disclosed invention provides a controller that can prevent overshoot and undershoot from occurring when a voltage is switched to another voltage without using two types of regulators. Voltage regulators supply a power supply voltage to a CPU. An SVID interface receives a command to change the number of voltage regulators to be actuated among the voltage regulators from outside. A phase clock generating circuit makes a stepwise change of the number of voltage regulators to be actuated from the current number of regulators to the commanded number of regulators after change.

12 Claims, 15 Drawing Sheets

| STEP | NUMBER OF PHASES TO CHANGE | EXECUTION TIME |
|---|---|---|
| STEP 1 | i(1) | $\Delta T(1)$ |
| STEP 2 | i(2) | $\Delta T(2)$ |
| STEP 3 | i(3) | $\Delta T(3)$ |
| STEP 4 | i(4) | $\Delta T(4)$ |

K=16, M=2

| STEP | NUMBER OF PHASES TO CHANGE | EXECUTION TIME |
|---|---|---|
| STEP 1 | i(1) | $\Delta T(1)$ |
| STEP 2 | i(2) | $\Delta T(2)$ |
| STEP 3 | i(3) | $\Delta T(3)$ |
| STEP 4 | i(4) | $\Delta T(4)$ |
| STEP 5 | i(5) | $\Delta T(5)$ |
| STEP 6 | i(6) | $\Delta T(6)$ |

⋮

| BEFORE SWITCHING | NUMBER OF PHASES K(=8) | EXECUTION TIME |
|---|---|---|
| STEP 1 | $+i(1)(=8)$<br>$K+i(1)(=8)$ | $\Delta T(1)$ |
| STEP 2 | $+i(2)(-4)$<br>$K+i(1)+i(2)(=4)$ | $\Delta T(2)$ |
| STEP 3 | $+i(3)=(-2)$<br>$K+i(1)+i(2)+i(3)(=2)$ | $\Delta T(3)$ |
| STEP 4 | $+i(4)(-1)$<br>$K+i(1)+i(2)+i(3)+i(4)=(1)$ | $\Delta T(4)$ |
| AFTER SWITCHING | $M(=1)$ | |

FIG. 9

| K=8, M=1 | | | |
|---|---|---|---|
| STEP | NUMBER OF PHASES | OFFSET VOLTAGE | EXECUTION TIME |
| STEP 1 | K | dv(1) | ΔT(1) |
| STEP 2 | K | dv(2) | ΔT(2) |
| STEP 3 | M | dv(3) | ΔT(3) |
| STEP 4 | M | dv(4) | ΔT(4) |
| STEP 5 | M | dv(5) | ΔT(5) |
| STEP 6 | M | dv(6) | ΔT(6) |

| K=8, M=1 | | | |
|---|---|---|---|
| STEP | NUMBER OF PHASES | FEEDBACK FACTOR | EXECUTION TIME |
| STEP 1 | K | F(1) | ΔT(1) |
| STEP 2 | K | F(2) | ΔT(2) |
| STEP 3 | M | F(3) | ΔT(3) |
| STEP 4 | M | F(4) | ΔT(4) |
| STEP 5 | M | F(5) | ΔT(5) |

| BEFORE SWITCHING | NUMBER OF PHASES K(=8) | AMPLIFICATION FACTOR F | EXECUTION TIME |
|---|---|---|---|
| STEP 1 | K | F(1)(=8) | ΔT(1) |
| STEP 2 | K | F(2)(=4) | ΔT(2) |
| STEP 3 | M | F(3)(=4) | ΔT(3) |
| STEP 4 | M | F(4)(=2) | ΔT(4) |
| STEP 5 | M | F(5)(=1) | ΔT(5) |
| AFTER SWITCHING | M(=1) | F(5)(=1) | |

US 9,046,903 B2

CONTROLLER

CROSS-REFERENCE TO RELATED APPLICATIONS

The disclosure of Japanese Patent Application No. 2011-261656 filed on Nov. 30, 2011 including the specification, drawings and abstract is incorporated herein by reference in its entirety.

BACKGROUND

The present invention relates to a controller and, in particular, to a controller for control of a power supply to a semiconductor device such as a CPU (Central Processing Unit).

A power supply device that can reduce overshoot/undershoot occurring when a power supply voltage is switched to another voltage and enables voltage switching at a higher speed is known.

For example, a power supply device according to Patent Document 1 (Japanese Published Unexamined Patent Application No. 2007-288974) operates as follows. In a transition state for increasing an output voltage, DD1 that is a DAC value in a register for DCDC, which is a register for a switching regulator 400, is supplied to a DAC 302 for LDO, instead of LD01 that is a DAC value in a register 201 for LD0, which is a register for a series regulator 300. The DAC 302 for LD0 of the series regulator 300 performs DAC operation, referring to DD1, a DAC value in the register 202 for DCDC.

RELATED ART DOCUMENT

Patent Document

[Patent Document 1] Japanese Published Unexamined Patent Application No. 2007-288974

SUMMARY

The device according to Patent Document 1 is intended to satisfy both responsiveness and efficiency when changing a voltage. In order to prevent overshoot and undershoot when a voltage is switched to another voltage, both LD0 having a high response speed and DCDC having a high power efficiency are actuated in voltage switching and their proportions for current driving are optimized by adjusting the voltage settings of the both.

However, the device according to Patent Document 1 requires two types of regulators: LD0 and DCDC.

Therefore, an object of the present invention is to provide a controller that that can prevent overshoot and undershoot from occurring when a voltage is switched to another voltage without using two types of regulators.

One aspect of the present invention resides in a controller controlling a plurality of voltage regulators that supply a power supply voltage to a first semiconductor device. The controller includes an interface that receives a command to change the number of voltage regulators to be actuated among the voltage regulators from outside and a control unit that makes a stepwise change of the number of voltage regulators to be actuated from the current number of regulators to the commanded number of regulators after change.

According to one aspect of the present invention, it is possible to prevent overshoot and undershoot from occurring when a voltage is switched to another voltage without using two types of regulators.

BRIEF DESCRIPTION OF THE DRAWINGS

FIG. 4 is a diagram exemplifying stepwise schedule tables according to the first embodiment.

FIG. 9 is a diagram exemplifying a stepwise schedule table according to the second embodiment.

FIG. 15 is a diagram exemplifying a stepwise schedule table according to the third embodiment.

FIG. 16 is a diagram for explaining how the amplification factor should change for the case where the current number of phases K is 8 and the number of phases after change M is 1.

DETAILED DESCRIPTION

Embodiments of the present invention will be described below with reference to the drawings.

First Embodiment

Figure 1:
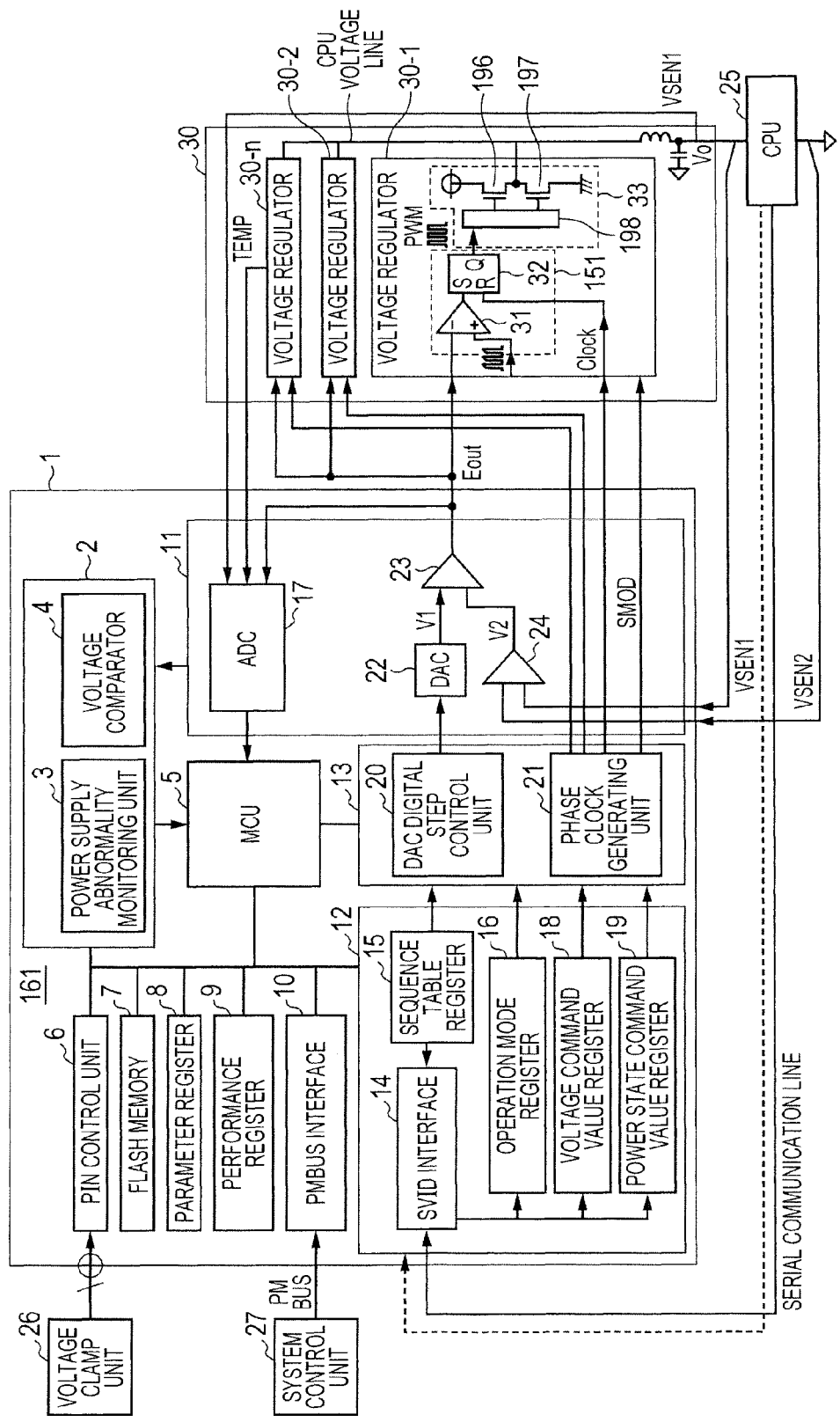
FIG. 1 is a diagram depicting a configuration of a semiconductor system according to a first embodiment.

FIG. 1 is a diagram depicting a configuration of a semiconductor system according to a first embodiment.

Referring to FIG. 1, this semiconductor system includes a controller 1, a regulator cluster 30, and a CPU 25.

The regulator cluster 30 supplies a voltage Vo to the CPU 25 under control of the controller 1 together with the CPU 25. The regulator cluster 30 includes voltage regulators 30-1 to 30-n.

The controller 1 herein is configured in a single chip (one semiconductor chip). The controller 1 includes a PIN control unit 6, a flash memory 7, a parameter register 8, a performance register 9, an MCU 5, a PMBUS (Power Management Bus) interface 10, an SVID (Serial VID) command decision circuit 12, a hard logic power supply control circuit 13, an analog power supply control circuit 11, and a power supply abnormality monitoring circuit 2.

Among the components of the controller 1, the MCU 5, hard logic power supply control circuit 13, analog power supply control circuit 11, and power supply abnormality monitoring circuit 2 make up a control unit 161.

The SVID command decision circuit 12 includes an SVID interface 14, an operation mode register 16, a voltage command value register 18, and a power state command value register 19.

The CPU 25 herein is configured in a single chip and it receives a power supply voltage which is output from the voltage regulators 30-1 to 30-n and performs various processing operations. Also, the CPU 25 sends a command to the controller 1 through the SVID interface 14. For example, the CPU 25 sends a control signal that gives a command to change the voltage regulators to be actuated to the controller 1 through the SVID interface 14.

The PIN control unit 6 outputs, to the MCU 5, setting information representing how an external terminal has been set, according to a terminal potential clamped by an external potential clamp unit 26.

The flash memory 7 stores a program for the MCU 5 to perform processing. By using the program, it is possible to cut out the need of redeveloping a device, even if power supply specifications have changed. Also, the flash memory 7 stores a table containing a plurality of parameters that specify initial values for a maximum allowable voltage, a maximum allowable temperature, a maximum allowable current, etc.

The parameter register 8 stores, inter alia, an amount of change of a voltage per step (a step voltage) in digital step control and a value of a difference ΔV between a commanded voltage that is a final voltage to which voltage should fall in a discharge mode and a target voltage Vs when the discharge mode terminates before the commended voltage is reached through the SVID interface 14.

The performance register 9 receives and stores data such as the maximum allowable voltage, maximum allowable temperature, and maximum allowable current recorded in the flash memory 7.

Here, the maximum allowable voltage is a maximum power supply voltage that can be applied to the CPU. The maximum allowable temperature is a highest temperature allowed for operation, measured by the voltage regulators or the like. The maximum allowable current is a maximum current allowed to flow by the voltage regulators. If any of these values has been exceeded, the controller outputs a command signal to decrease the value to the voltage regulators or the like.

The MCU 5 performs arithmetic processing according to a program. The PMBUS interface 10 receives a signal from and outputs a signal to an external system control unit 27 through the PMBUS.

The SVID interface 14 receives a signal from and outputs a signal to the CPU 25 through a serial communication line.

The operation mode register 16 stores a current operation mode. For example, there are a normal mode and a discharge mode, among others, as operation modes.

The voltage command value register 18 stores a value of a commanded voltage when voltage control is performed. The power state command value register 19 stores a specified value for a power state mode when power state control is performed.

A sequence table register 15 stores stepwise schedule tables. A stepwise schedule table specifies the number of phases and an execution time for each of multiple steps for each of combinations of a number as the number of phases before change and a number as the number of phases after change. Here, the number of phases is the number of voltage regulators to be actuated.

The hard logic power supply control circuit 13 includes a DAC digital step control unit 20 and a phase clock generating unit 21.

The DAC digital step control unit 20 determines a voltage change value for each step and outputs the determined voltage change value as a digital voltage DV, so that a commanded voltage is reached in multiple steps.

The phase clock generating unit 21 activates a control signal SMOD to the voltage regulators to be actuated. The phase clock generating unit 21 determines a phase for a phase clock to the voltage regulators to be actuated and outputs a phase clock with the determined phase. The phase clock generating unit 21 generates a phase clock at timing of a PWM (Pulse Width Modulation) cycle in accordance with an internal timer. Phase clocks for the voltage regulators have the same cycle (PWM cycle), but their phases all differ. The phase clock generating unit 21 deactivates the control signal SMOD to the voltage regulators to be deactuated.

When the phase clock generating unit 21 receives a control command that gives a command to change the number of voltage regulators to be actuated (the number of phases) from the CPU 25, it makes a stepwise change of the number of phases from the current number of phases to the number of phases after change commanded by the CPU 25, according to a stepwise schedule table in the sequence table register. The phase clock generating unit 21 switches from one step to another according to the execution time of each step specified in a stepwise schedule table.

The analog power supply control circuit 11 includes a DAC (Digital to Analog Converter) 22, a differential amplifier 24, an error amplifier 23, and an ADC (Analog to Digital Converter) 17.

The DAC 22 converts a digital voltage DV output from the DAC digital step control unit 20 to an analog voltage V1.

The differential amplifier 24 amplifies a difference between a high potential voltage VSEN1 and a low potential voltage VSEN2 for the CPU 25 and outputs a voltage V2.

The error amplifier 23 amplifiers a difference between the voltage V1 which is output from the DAC 22 and the voltage V2 which is output from the differential amplifier 24 and outputs the amplified voltage to the voltage regulators as a voltage representing a difference between the specified voltage and the voltage being now supplied to the CPU 25.

The ADC 17 performs A/D conversion of the output voltages of the voltage regulators 30-1 to 30-n among others. The power supply abnormality monitoring circuit 2 includes a voltage comparator 4 and a power supply abnormality monitoring unit 3.

The voltage comparator 4 receives a voltage generated by the voltage regulators and compares it with a predetermined standard voltage by analog processing.

The power supply abnormality monitoring unit 3 monitors whether or not the power supply voltage to the CPU 25 is abnormal, according to the output of the voltage comparator 4.

The voltage regulators 30-1 to 30-n supply a power supply voltage to the CPU 25. Here, each voltage regulator 30-1 to 30-n is enclosed in a single package. Further, here, each voltage regulator is made up of three chips for a high-side MOS transistor 196, a low-side MOS transistor 197, and other parts (a PWM unit 151 and a MOS control unit 198) within the package.

Each voltage regulator 30-1 to 30-*n* includes a PWM unit 151 and a DC-DC converter 33. Each voltage regulator 30-1 to 30-*n* starts to operate when its control signal SMOD is activated and stops its operation when the control signal SMOD is deactivated.

The PWM unit 151 includes a PWM comparator 31 and a latch circuit 32. The PWM comparator 31 outputs a PWM signal, based on an error signal which is output by the error amplifier 23.

Output of the PWM comparator 31 is input to a "set" terminal S of the latch circuit 32. A clock which is output by the phase clock generating unit 21 is input to a "reset" terminal R of the latch circuit 32.

The DC-DC converter 33 is coupled to the output of the latch circuit 32 and supplies a power supply voltage to the CPU 25. Here, the DC-DC converter 33 is controlled by a PWM signal which is output from the latch circuit 32.

By turn ON of the high-side MOS transistor 196 and turn OFF of the low-side MOS transistor 197, which are shown in FIG. 1, a high potential voltage VSEN1 on a CPU voltage line rises. On the other hand, by turn OFF of the high-side MOS transistor 196 and turn ON of the low-side MOS transistor 197, the voltage VSEN1 on the CPU voltage line falls.

In a normal mode, ON/OFF of the high-side MOS transistor 196 and the low-side MOS transistor 197 is controlled so that the voltage VSEN1 on the CPU voltage line will be a constant voltage. That is, in a case when the voltage is low, by turning the high-side MOS transistor 196 ON (at this time, turning the low-side MOS transistor 197 OFF), the voltage is made to rise. In a case when the voltage is high, by turning the low-side MOS transistor 197 ON (at this time, turning the high-side MOS transistor 196 OFF), the voltage is made to fall.

(Power Supply Control Operation)

Figure 2:
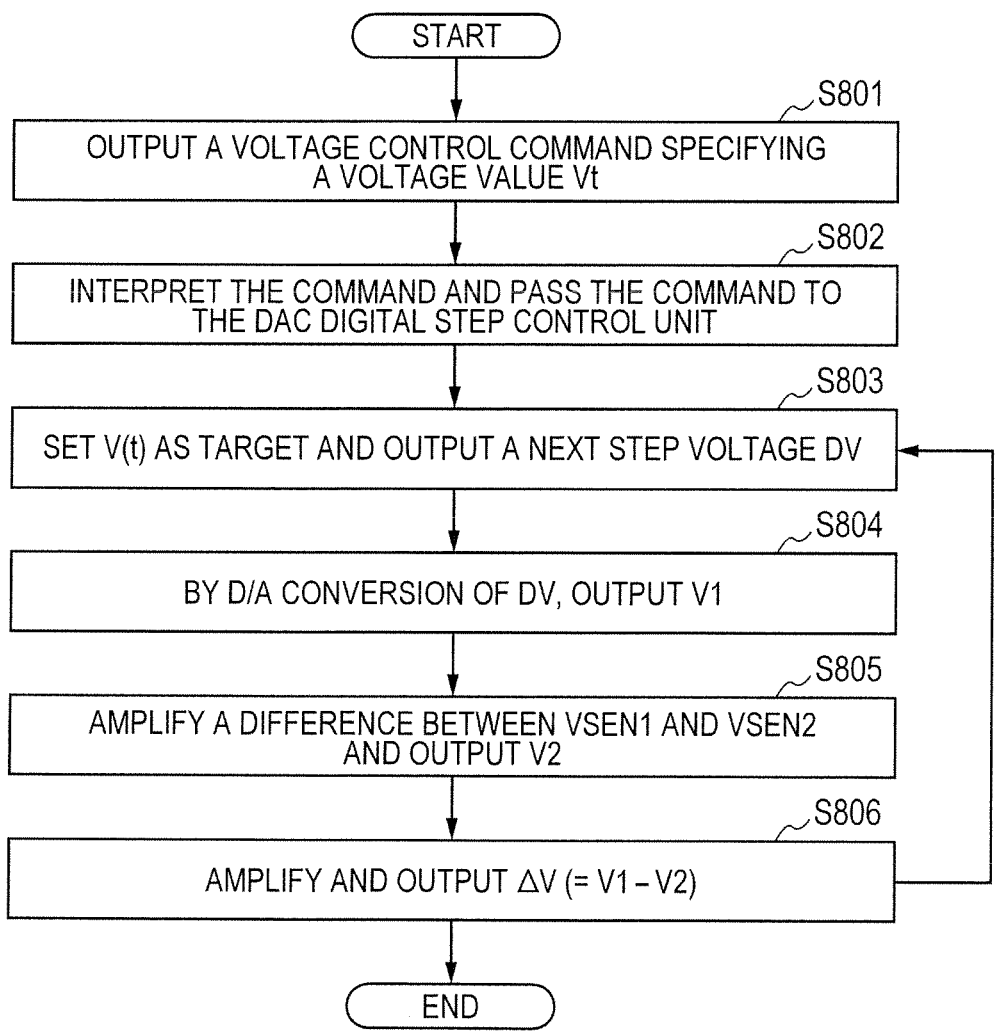
FIG. 2 is a flowchart illustrating a processing procedure of a voltage control operation according to the first embodiment.

FIG. 2 is a flowchart illustrating a processing procedure of a voltage control operation according to the first embodiment.

Referring to FIG. 2, the CPU 25 outputs a voltage control command specifying a voltage value Vt onto the serial communication line (step S801).

The SVID interface 14 interprets the command received through the serial communication line and passes the command to control voltage to the DAC digital step control unit 20 (step S802).

The DAC digital step control unit 20 sets the normal commanded voltage Vt specified in the command as a target voltage and outputs a digital voltage DV to reach the target voltage (step S803).

The DAC 22 converts the digital voltage DV to an analog voltage V1 (step S804).

The differential amplifier 24 amplifies a difference between a high potential voltage VSEN1 and a low potential voltage VSEN2 for the CPU 25 and outputs a voltage V2 (step S805).

The error amplifier 23 amplifies a difference between the voltage V1 which is output from the DAC 22 and the voltage V2 which is output from the differential amplifier 24 and outputs the amplified voltage (Eout) to the voltage regulators as a voltage representing a difference between the specified voltage and the voltage being now supplied to the CPU 25. Each voltage regulator modifies its output voltage, based on the voltage (Eout) output from the error amplifier 23. For example, if the high potential voltage VSEN1 is lower than the commanded voltage Vt, the voltage regulator causes the high potential voltage VSEN1 to rise by turning the high-side MOS transistor 196 ON. If the high potential voltage VSEN1 is higher than the commanded voltage Vt, the voltage regulator causes the high potential voltage VSEN1 to fall by turning the low-side MOS transistor 197 ON (step S806).

After that, the procedure returns to step S803 and processing is repeated. Thereby, CPU supply voltage is controlled so that the high potential voltage VSEN1 becomes equal to the commended voltage Vt.

(Operation of Controlling the Number of Phases)

Figure 3:
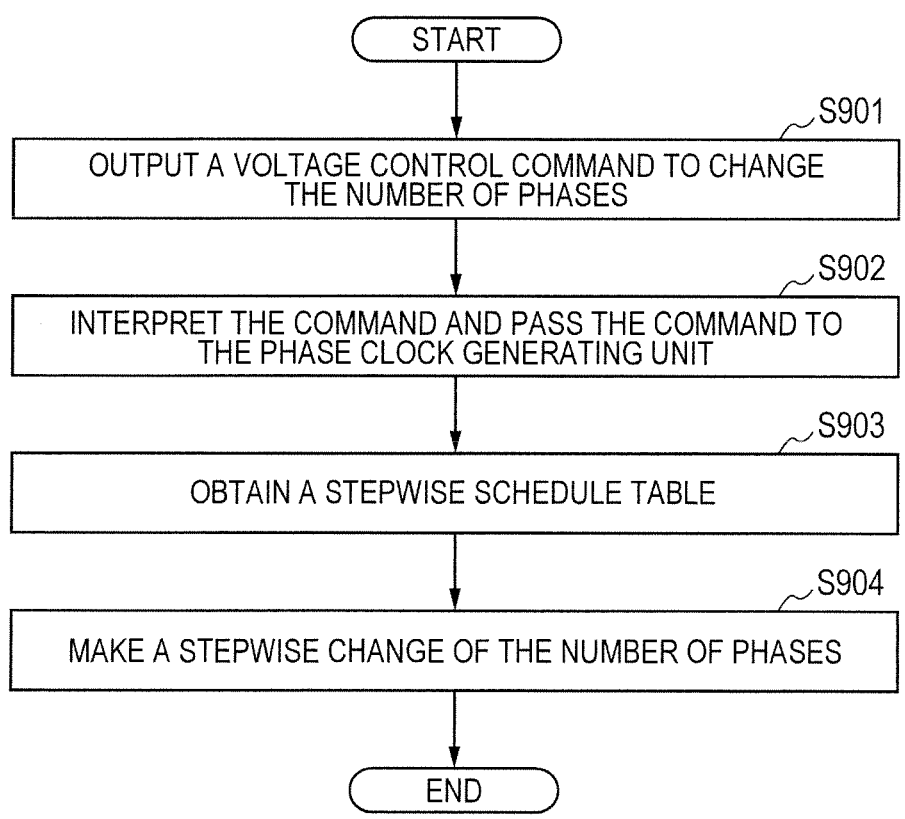
FIG. 3 is a flowchart illustrating a procedure for controlling the number of phases according to the first embodiment.

FIG. 3 is a flowchart illustrating a procedure for controlling the number of phases according to the first embodiment.

First, the CPU 25 outputs a control command that gives a command to change the number of voltage regulators to be actuated (the number of phases) among the multiple voltage regulators onto the serial communication line (step S901).

The SVID interface 14 interprets the control command received through the serial communication line and passes the command to control the number of phases to the phase clock generating unit 21 (step S902).

The phase clock generating unit 21 obtains a stepwise schedule table corresponding to the combination of the commanded number of phases and the current number of phases from the sequence table register (step S903).

The phase clock generating unit 21 changes the number of phases according to the stepwise schedule table. The phase clock generating unit 21 determines which voltage regulator (s) to be actuated and which voltage regulators) to be deactuated among the voltage regulators 30-1 to 30-*n*, according to the number of phases in each step. When changing the number of phases, this determination is made so that phase clocks become as even as possible. For example, when eight phase clocks are output from eight voltage regulators, and if the number of phases should be changed to four, the phase clock generating unit 21 determines voltage regulator (s) to be actuated and voltage regulator (s) to be deactuated, so that the intervals of four phase clocks which are output as the result of the change will be even. The phase clock generating unit 21 activates the control signal SMOD to each voltage regulator to be actuated and outputs a phase clock with a determined phase to each voltage regulator to be actuated. Each voltage regulator, upon receiving the activated control signal SMOD, outputs a voltage based on the clock that is sent from the phase clock generating unit 21. The phase clock generating unit 21 deactivates the control signal SMOD to each voltage regulator to be deactuated. Each voltage regulator, upon receiving the deactivated control signal SMOD, stops its voltage output (step S904).

FIG. 4 is a diagram exemplifying stepwise schedule tables according to the first embodiment. In one example in FIG. 4, for a case where the current number of phases K is 8 and the number of phases after change M is 1, the table is defined to change the phases in four steps. It is defined that, in step 1, the number of phases should be augmented with "+i(1)" within execution time $\Delta T(1)$. It is defined that, in step 2, the number of phases should be augmented with "+i(2)" within execution time $\Delta T(2)$. It is defined that, in step 3, the number of phases should be augmented with "+i(3)" within execution time $\Delta T(3)$. It is defined that, in step 4, the number of phases should be augmented with "+i(4)" within execution time $\Delta T(4)$.

In another example in FIG. 4, for a case where the current number of phases K is 16 and the number of phases after change M is 2, the table is defined to change the phases in six steps. It is defined that, in step 1, the number of phases should be augmented with "+i(1)" within execution time $\Delta T(1)$. It is defined that, in step 2, the number of phases should be augmented with "+i(2)" within execution time $\Delta T(2)$. It is defined that, in step 3, the number of phases should be augmented with "+i(3)" within execution time $\Delta T(3)$. It is defined that, in step 4, the number of phases should be augmented with "+i (4)" within execution time ΔT(4). It is defined that, in step 5, the number of phases should be augmented with "+i(5)" within execution time ΔT(5). It is defined that, in step 6, the number of phases should be augmented with "+i(6)" within execution time ΔT(6).

Figures 5, 6:
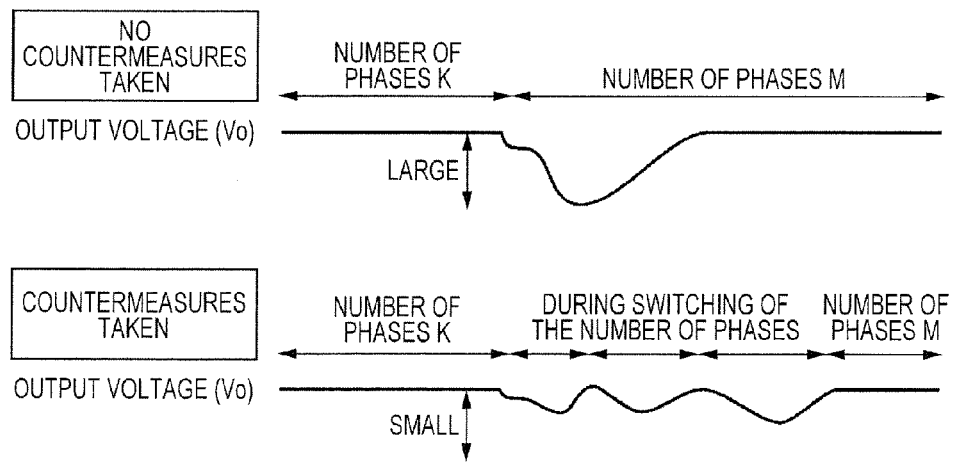
FIG. 5 is a diagram for explaining how the number of phases should change for a case where the current number of phases K is 8 and the number of phases after change M is 1.
FIG. 6 is a diagram presenting an example of how the output voltage (Vo) of the regulator cluster 30 in the first embodiment will change.

FIG. 5 is a diagram for explaining how the number of phases should change for the case where the current number of phases K is 8 and the number of phases after change M is 1. Here, it is assumed that i(1)=0, i(2)=−4, i(3)=−2, and i(4)=−1.

First, in step 1, the number of phases becomes K+i(1) (i.e., 8). In step 2, the number of phases becomes K+i(1)+i(2) (i.e., 4). In step 3, the number of phases becomes K+i(1)+i(2)+i(3) (i.e., 2). In step 4, the number of phases becomes K+i(1)+i(2)+i(3)+i(4) (i.e., 1).

FIG. 6 is a diagram presenting an example of how the output voltage (Vo) of the regulator cluster 30 in the first embodiment will change.

As can be seen in FIG. 6, in a case where the number of phases is rapidly changed from 8 to 1, as heretofore practiced, the output voltage (Vo) abruptly changes and undershoot occurs.

In a case where the number of phases is changed in a stepwise manner from 8 to 4 to 2 to 1, as implemented in the present embodiment, the output voltage (Vo) moderately changes and no undershoot occurs.

As above, according to the present embodiment, undershoot can be prevented from occurring by gradually changing the number of phases.

Besides, according to the present invention, when the number of phases is diminished, determining which voltage regulator (s) to be actuated and which voltage regulator (s) to be deactuated is made so that the intervals of a plurality of phase clocks which are output from the regulator cluster 30 will be even. Thus, it is possible stabilize voltage.

Stepwise schedule settings are held on a register and whether the appropriate one of these settings should apply may be altered depending on the situation as to whether priority is given to voltage stabilization or quick switching. For example, if it is desired to make an immediate change to load condition, the number of phases needs to be switched over quickly. So, it is also possible to directly change the number of phases from 8 to 1.

Moreover, according to the present embodiment, even if there is a voltage variation found after designing a board is finished, such voltage variation can be coped with only by modifying firmware without a need to readjust a filter circuit outside the IC.

If the number of phases is diminished in the middle of a PWM cycle, unbalanced switching of voltage regulators may occur and voltage may become hard to stabilize. In such a case, it is also possible to synchronize the execution time of each step (that is, step switching timing) with PWM cycle timing. Alternatively, switching timing for a part of multiple steps may be synchronized with the PWM cycle, whereas switching timing for other steps may follow setting in a stepwise schedule table.

Second Embodiment

Figure 7:
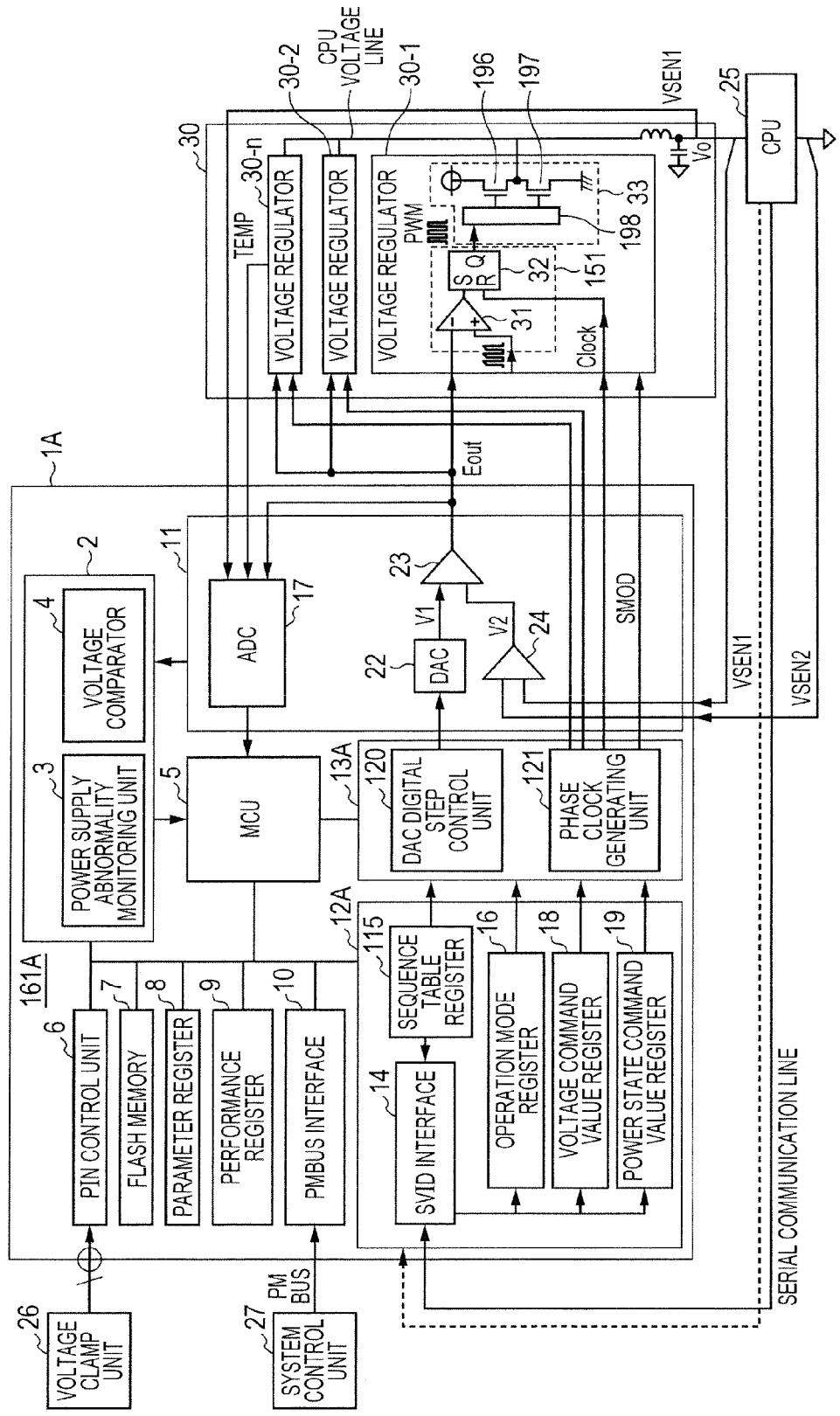
FIG. 7 is a diagram depicting a configuration of a semiconductor system according to a second embodiment.

FIG. 7 is a diagram depicting a configuration of a semiconductor system according to a second embodiment.

Referring to FIG. 7, this semiconductor system differs from the semiconductor system of the first embodiment shown in FIG. 1 in the following respect with regard to a controller 1A.

A sequence table register 115 in an SVID command decision circuit 12A stores stepwise schedule tables. A stepwise schedule table specifies an offset voltage and an execution time for each of multiple steps for each of combinations of a number as the number of phases before change and a number as the number of phases after change. Here, the offset voltage is used to set a target voltage from a voltage commanded by the CPU 25.

A phase clock generating unit 121 in a hard logic power supply control circuit 13A, upon receiving a control command that gives a command to change the number of voltage regulators to be actuated (the number of phases) from the CPU 25, changes the current number of phases to the number of phases after change commanded by the CPU 25.

A DAC digital step control unit 120 in the hard logic power supply control circuit 13A, when not receiving a control command that gives a command to change the number of voltage regulators to be actuated (the number of phases) from the CPU 25, sets the commanded voltage as a target voltage and performs voltage control so that the supply voltage to the CPU 25 becomes equal to the target voltage, as described for the first embodiment.

The DAC digital step control unit 120, upon receiving a control command that gives a command to change the number of voltage regulators to be actuated (the number of phases) from the CPU 25, makes a stepwise change of a target voltage by adding an offset voltage to the commanded voltage in a stepwise manner and performs voltage control so that the supply voltage to the CPU 25 becomes equal to the target voltage in each step, according to a schedule defined by a stepwise schedule table in the sequence table register 115, during transition from the current number of regulators to the commanded number of regulators after change and before and after the transition. The DAC digital step control unit 120 switches from one step to another according to the execution time of each step specified in a stepwise schedule table.

(Power Supply Control Operation)

Figure 8:
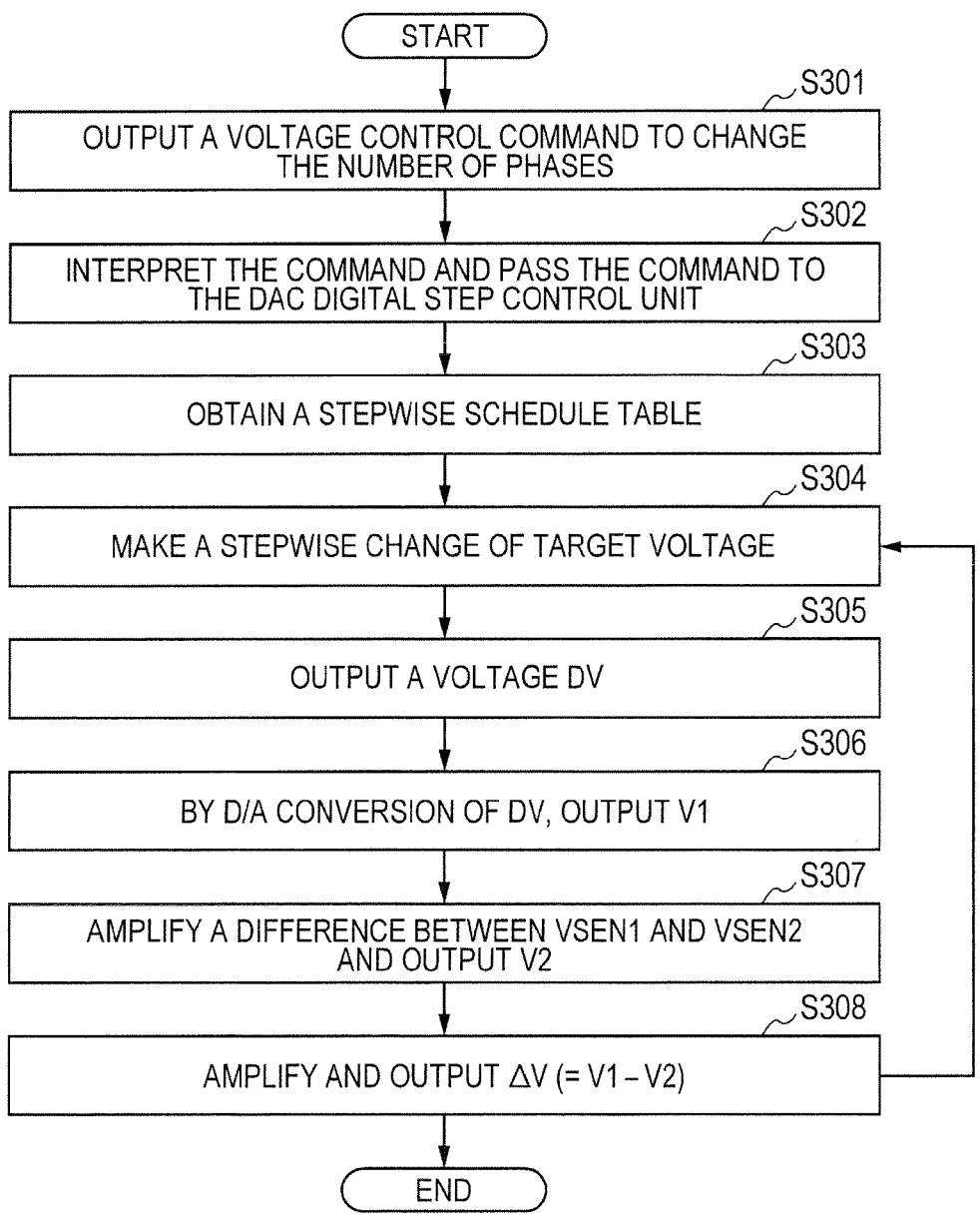
FIG. 8 is a flowchart illustrating a procedure for target voltage control when changing the number of phases according to the second embodiment.

FIG. 8 is a flowchart illustrating a procedure for target voltage control when changing the number of phases according to the second embodiment.

First, the CPU 25 outputs a control command specifying the number of phases to change to onto the serial communication line (step S301).

The SVID interface 14 interprets the control command received through the serial communication line and passes the command to control the number of phases to the DAC digital step control unit 120 (step S302).

The DAC digital step control unit 120 obtains a stepwise change schedule corresponding to the combination of the commanded number of phases and the current number of phases from the sequence table register (step S303).

The DAC digital step control unit 120 changes a target voltage by adding an offset voltage according to the stepwise change schedule (step S304) and outputs a digital voltage DV (step S305).

The DAC 22 converts the digital voltage DV to an analog voltage V1 (step S306). The differential amplifier 24 amplifies a difference between a high potential voltage VSEN1 and a low potential voltage VSEN2 for the CPU 25 and outputs a voltage V2 (step S307).

The error amplifier 23 amplifiers a difference between the voltage V1 which is output from the DAC 22 and the voltage V2 which is output from the differential amplifier 24 and outputs the amplified voltage (Eout) to the voltage regulators as a voltage representing a difference between the specified voltage and the voltage being now supplied to the CPU 25. Each voltage regulator modifies its output voltage, based on the voltage (Eout) output from the error amplifier 23. For example, if the high potential voltage VSEN1 is lower than the commanded voltage Vt, the voltage regulator causes the high potential voltage VSEN1 to rise by turning the high-side MOS transistor 196 ON. If the high potential voltage VSEN1 is higher than the commanded voltage Vt, the voltage regulator causes the high potential voltage VSEN1 to fall by turning the low-side MOS transistor 197 ON (step S308).

After that, the procedure returns to step S304 and processing is repeated. FIG. 9 is a diagram exemplifying a stepwise schedule table according to the second embodiment.

In one example in FIG. 9, for a case where the current number of phases K is 8 and the number of phases after change M is 1, the table is defined to change the phases in six steps. It is defined that, in step 1 for which execution time is ΔT(1), the number of phases should remain at K and the target voltage should be augmented with "+dv(1)" from the commanded voltage Vt. It is defined that, in step 2 for which execution time is ΔT(2), the number of phases should remain at K and the target voltage should further be augmented with "+dv(2)". It is defined that, in step 3 for which execution time is ΔT(3), the number of phases should change to M and the target voltage should further be augmented with "+dv(3)". It is defined that, in step 4 for which execution time is ΔT(4), the number of phases should remain at M and the target voltage should further be augmented with "+dv(4)". It is defined that, in step 5 for which execution time is ΔT(5), the number of phases should remain at M and the target voltage should further be augmented with "+dv(5)". It is defined that, in step 6 for which execution time is ΔT(6), the number of phases should remain at M and the target voltage should further be augmented with "+dv(6)".

Figure 10:
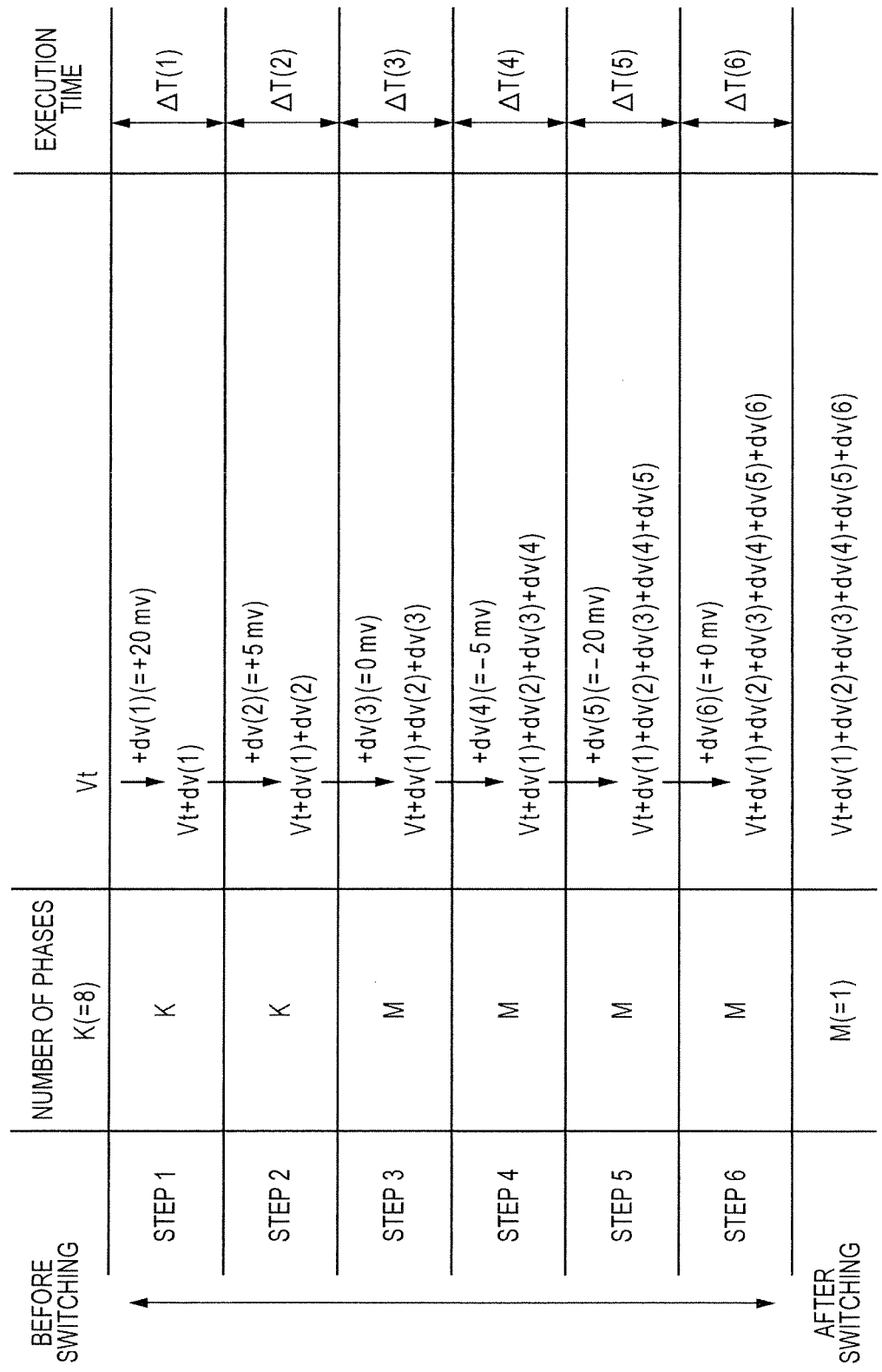
FIG. 10 is a diagram for explaining how the number of phases and the target voltage should change for a case where the current number of phases K is 8 and the number of phases after change M is 1.

FIG. 10 is a diagram for explaining how the number of phases and the target voltage should change for the case where the current number of phases K is 8 and the number of phases after change M is 1. Here, it is assumed that dv(1)=+20 mV, dv(2)=+5 mV, dv(3)=0 mV, dv(4)=−5 mV, dv(5)=−20 mV, and dv(6)=0 mV.

First, in step 1, the number of phases remains at K and the target voltage becomes Vt+dv(1). In step 2, the number of phases remain at K and the target voltage becomes Vt+dv(1)+dv(2). In step 3, the number of phases changes to M and the target voltage becomes Vt+dv(1)+dv(2)+dv(3). In step 4, the number of phases remains at M and the target voltage becomes Vt+dv(1)+dv(2)+dv(3)+dv(4). In step 5, the number of phases remains at M and the target voltage becomes Vt+dv(1)+dv(2)+dv(3)+dv(4). In step 5, the number of phases changes to M and the target voltage becomes Vt+dv(1)+dv(2)+dv(3)+dv(4)+dv(5). In step 6, the number of phases remains at M and the target voltage becomes Vt+dv(1)+dv(2)+dv(3)+dv(4)+dv(5)+dv(6).

Figure 11:
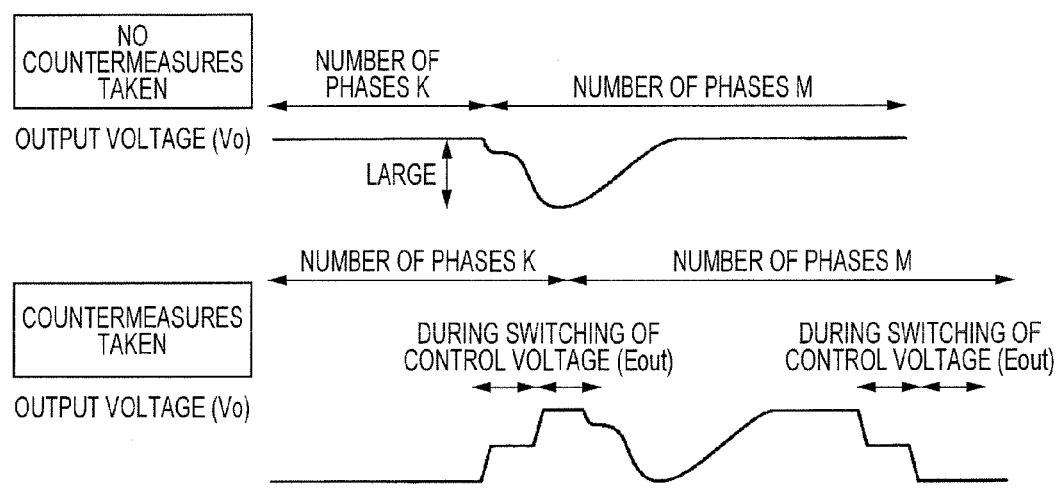
FIG. 11 is a diagram presenting an example of how the output voltage (Vo) of the regulator cluster 30 in the second embodiment will change.

FIG. 11 is a diagram presenting an example of how the output voltage (Vo) of the regulator cluster 30 in the second embodiment will change.

As can be seen in FIG. 11, in a case where an offset voltage is not added to a commanded voltage, when changing the number of phases, as heretofore practiced, the output voltage (Vo) abruptly changes and undershoot occurs.

In a case where an offset voltage is added to a commanded voltage in a stepwise manner, when changing the number of phases, as implemented in the present embodiment, the output voltage (Vo) moderately changes and no undershoot occurs.

As above, according to the present embodiment, by positively offsetting (increasing) the target voltage before switching of the number of phases and negatively offsetting (decreasing) the target voltage after the switching of the number of phases, it is possible to compensate for undershoot.

If step switching occurs in the middle of a PWM cycle, unbalanced switching of voltage regulators may occur and voltage may become hard to stabilize. In such a case, it is also possible to synchronize the execution time of each step (that is, step switching timing) with PWM cycle timing. Alternatively, switching timing for a part of multiple steps (a step in which the number of phases should change and/or a step in which an offset voltage should change) may be synchronized with the PWM cycle, whereas switching timing for other steps may follow setting in a stepwise schedule table.

Moreover, according to the present embodiment, even if there is a voltage variation found after designing a board is finished, such voltage variation can be coped with only by modifying firmware without a need to readjust a filter circuit outside the IC.

An Example of Modification to the Second Embodiment

In this example of modification, switching of the number of phases takes place according to timing of a PWM cycle interrupt (which is generated by a timer in the phase clock generating unit) which occurs per PWM cycle.

Figure 12:
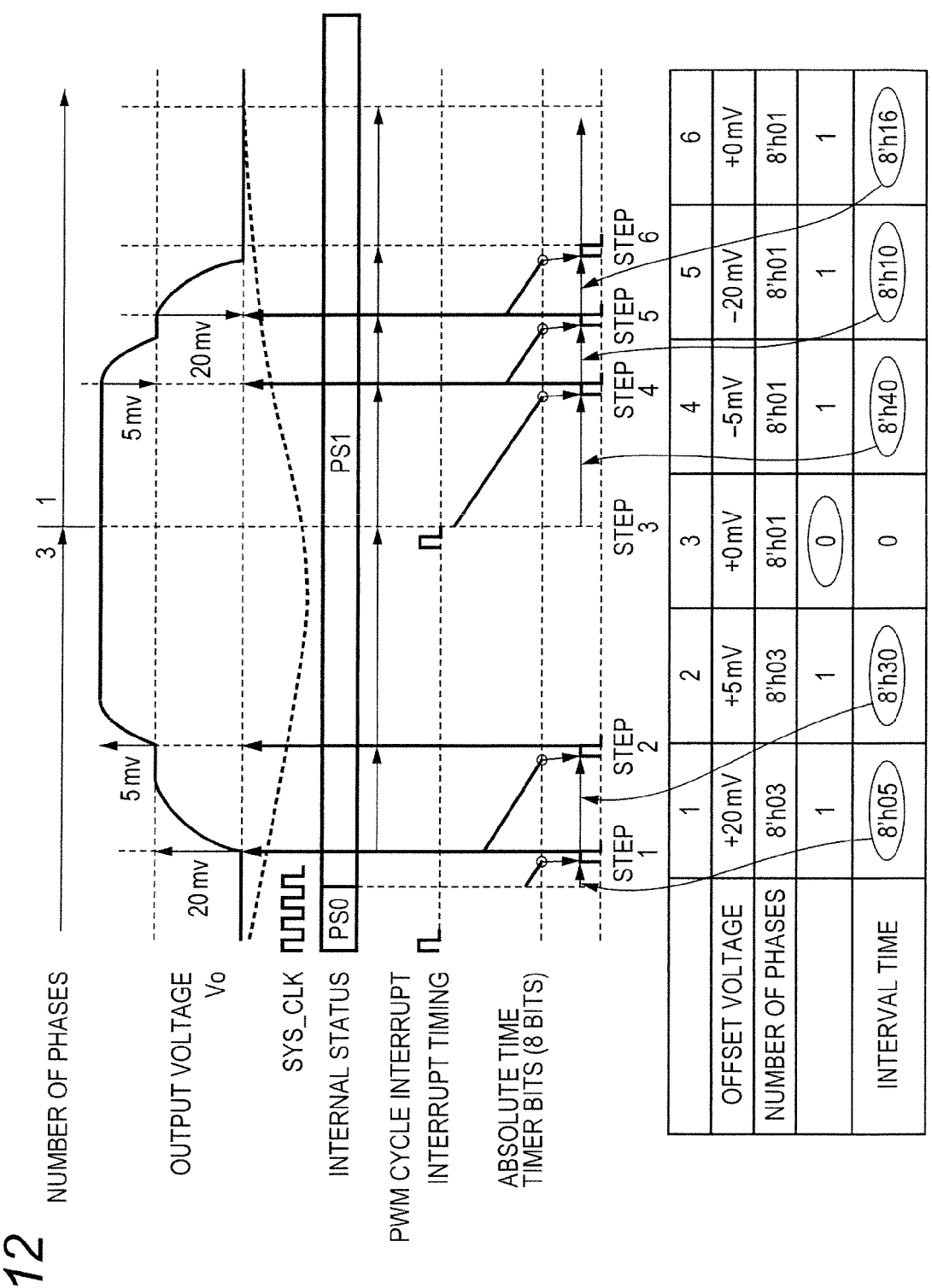
FIG. 12 is a diagram for explaining how control is implemented in an example of modification to the second embodiment.

FIG. 12 is a diagram for explaining how control is implemented in the example of modification to the second embodiment. As described in the second embodiment, the offset voltage is changed in a stepwise manner in steps 1 to 6, when the number of phases is changed from 3 to 1.

First, in step 1, the number of phases remains at 1 and the commanded voltage Vt plus an offset voltage of 20 mV is set as the target voltage.

In step 2, the number of phases remains at 1 and the target voltage is increased by adding an offset voltage of +5 mV.

In step 3, the number of phases changes to 3 and no offset voltage is added. In step 4, the number of phases remains at 3 and the target voltage is decreased by adding an offset voltage of −5 mV.

In step 5, the number of phases remains at 3 and the target voltage is decreased by adding an offset voltage of −20 mV.

In step 6, the number of phases remains at 3 and no offset voltage is added. When having received a command to change the number of phases, the internal status changes from PS0 to PS1. From the time instant at which the status changed to PS1, upon the elapse of a time "8h05" specified in the stepwise schedule table, step 1 starts.

From the start of step 1, upon the elapse of a time "8h30" specified in the stepwise schedule table, step 1 terminates and step 2 starts.

When a PWM cycle interrupt has occurred, step 2 terminates and step 3 starts. From the start of step 3, upon the elapse of a time "8h40" specified in the stepwise schedule table, step 3 terminates and step 4 starts.

From the start of step 4, upon the elapse of a time "8h10" specified in the stepwise schedule table, step 4 terminates and step 5 starts.

From the start of step 5, upon the elapse of a time "8h16" specified in the stepwise schedule table, step 5 terminates and step 6 starts.

Third Embodiment

Figure 13:
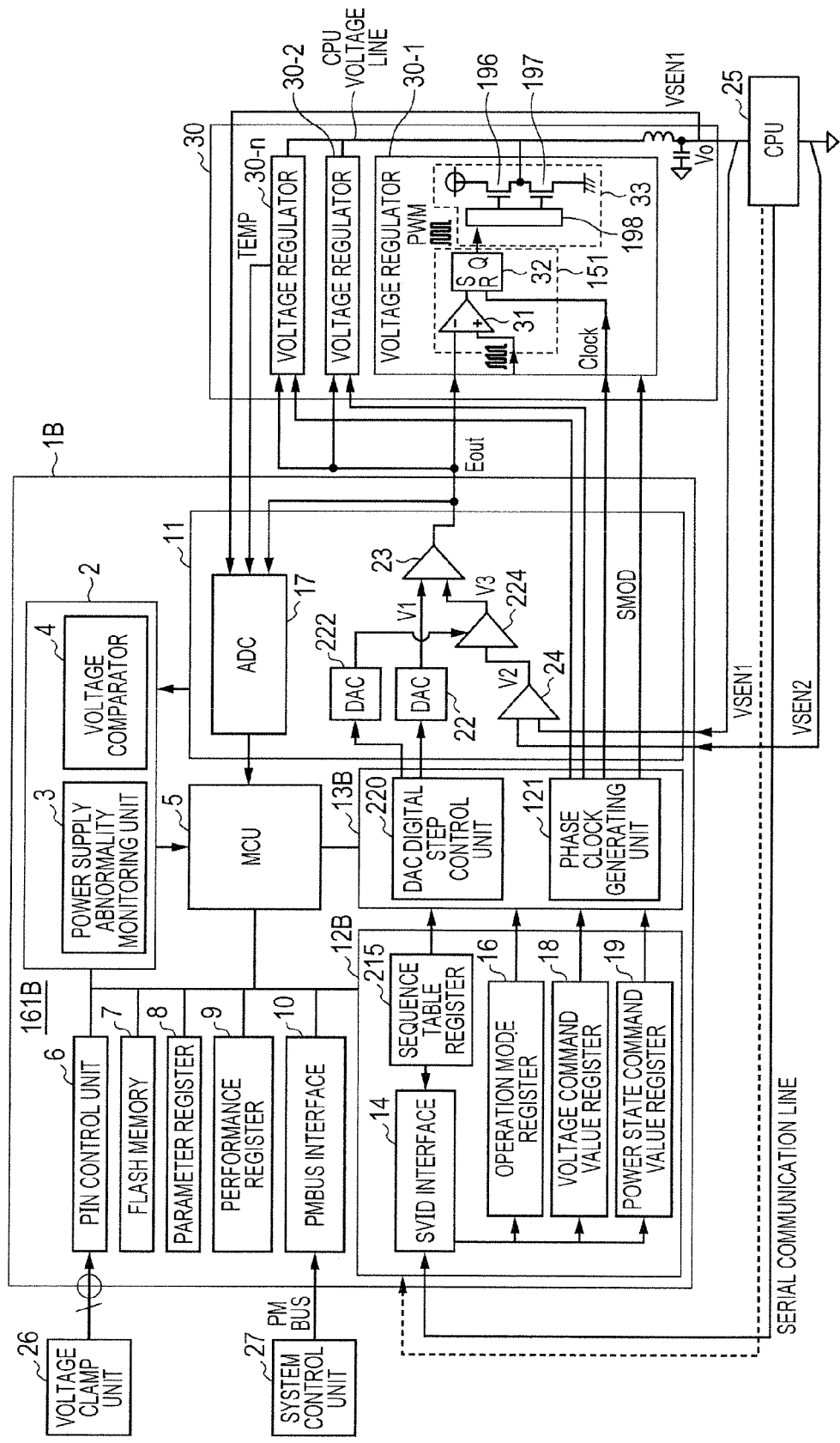
FIG. 13 is a diagram depicting a configuration of a semiconductor system according to a third embodiment.

FIG. 13 is a diagram depicting a configuration of a semiconductor system according to a third embodiment.

Referring to FIG. 13, this semiconductor system differs from the semiconductor system of the first embodiment shown in FIG. 1 in the following respect with regard to a controller 1B.

A sequence table register 215 in an SVID command decision circuit 12B stores stepwise schedule tables. A stepwise schedule table specifies an amplification factor and an execution time for each of multiple steps for each of combinations of a number as the number of phases before change and a number as the number of phases after change. Here, the amplification factor is the amplification factor of a variable amplifier 224 that amplifies a voltage V2 which is output from a differential amplifier 24.

A phase clock generating unit 121 in a hard logic power supply control circuit 13B, upon receiving a control command that gives a command to change the number of voltage regulators to be actuated (the number of phases) from the CPU 25, changes the current number of phases to the number of phases after change commanded by the CPU 25.

A DAC digital step control unit 220 in the hard logic power supply control circuit 13B, when not receiving a control command that gives a command to change the number of voltage regulators to be actuated (the number of phases) from the CPU 25, makes the amplification factor of the variable amplifier 224 set to "1" via the DAC 222 (that is, no amplification is performed). Thereby, a voltage corresponding to a difference between a voltage being supplied to the CPU 25 and a commanded voltage is supplied to the voltage regulators.

The DAC digital step control unit 220, upon receiving a control command that gives a command to change the number of voltage regulators to be actuated (the number of phases) from the CPU 25, makes a stepwise change of the amplification factor of the variable amplifier 224, according to a schedule defined by a stepwise schedule table in the sequence table register 115, during transition from the current number of regulators to the commanded number of regulators after change and before and after the transition. Thereby, a voltage corresponding to a difference between a voltage amplified by amplifying a voltage being supplied to the CPU 25 by an amplification factor in each step and a commanded voltage is supplied to the voltage regulators.

The DAC digital step control unit 220 switches from one step to another according to the execution time of each step specified in a stepwise schedule table.

The DAC 22 converts a digital voltage DV output from the DAC digital step control unit 220 to an analog voltage V1. The differential amplifier 24 amplifies a difference between a high potential voltage VSEN1 and a low potential voltage VSEN2 for the CPU 25 and outputs a voltage V2. The variable amplifier 224 amplifies the voltage V2 which is output from the differential amplifier 24 by an amplification factor that is set by the DAC 222 and outputs a voltage V3.

The error amplifier 23 amplifies the voltage V1 which is output from the DAC 22 and the voltage V3 which is output from the variable amplifier 224 and outputs the amplified voltage to the voltage regulators as a voltage representing a difference between the specified voltage and the voltage being now supplied to the CPU 25.

(Power Supply Control Operation)

Figure 14:
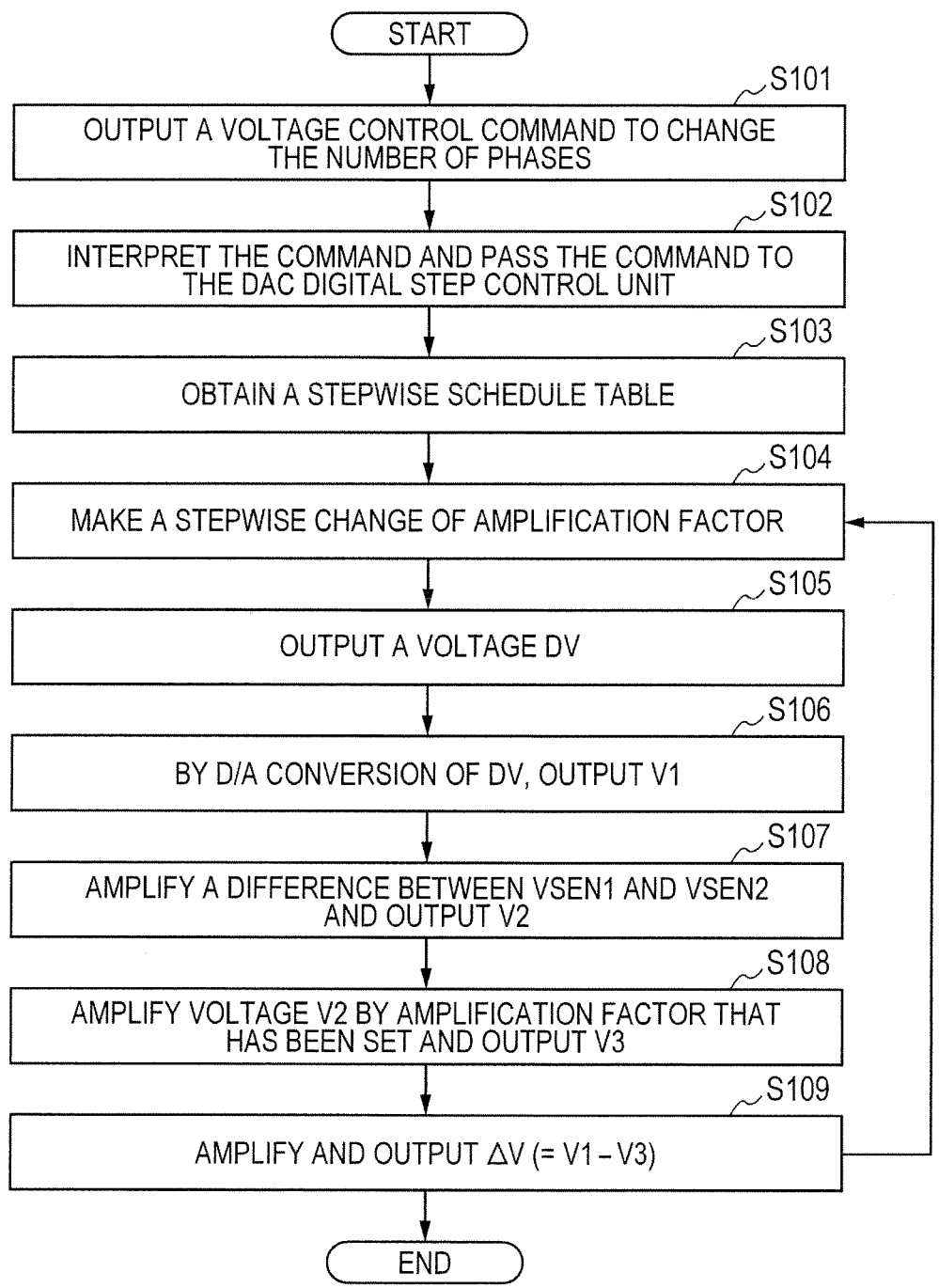
FIG. 14 is a flowchart illustrating a procedure for changing an amplification factor when changing the number of phases according to the third embodiment.

FIG. 14 is a flowchart illustrating a procedure for changing an amplification factor when changing the number of phases according to the third embodiment.

First, the CPU 25 outputs a control command specifying the number of phases to change to onto the serial communication line (step S101).

The SVID interface 14 interprets the control command received through the serial communication line and passes the command to control the number of phases to the DAC digital step control unit 220 (step S102).

The DAC digital step control unit 220 obtains a stepwise change schedule corresponding to the combination of the commanded number of phases and the current number of phases from the sequence table register (step S103).

The DAC digital step control unit 220 changes the amplification factor of the variable amplifier 224 via the DAC 22 according to the stepwise change schedule (step S104).

The DAC digital step control unit 20 sets the normal commanded voltage as a target voltage and outputs a digital voltage DV to reach the target voltage (step S105).

The DAC 22 converts the digital voltage DV to an analog voltage V1 (step S106). The differential amplifier 24 amplifies a difference between a high potential voltage VSEN1 and a low potential voltage VSEN2 for the CPU 25 and outputs a voltage V2 (step S107).

The variable amplifier 224 amplifies the output of the differential amplifier 24 by an amplification factor that has been set and outputs a voltage V3 (step S108).

The error amplifier 23 amplifies a difference between the voltage V1 which is output from the DAC 22 and the voltage V3 which is output from the variable amplifier 224 and outputs the amplified voltage (Eout) to the voltage regulators as a voltage representing a difference between the specified voltage and the voltage being now supplied to the CPU 25. Each voltage regulator modifies its output voltage, based on the voltage (Eout) output from the error amplifier 23. For example, if the high potential voltage VSEN1 is lower than the commanded voltage Vt, the voltage regulator causes the high potential voltage VSEN1 to rise by turning the high-side MOS transistor 196 ON. If the high potential voltage VSEN1 is higher than the commanded voltage Vt, the voltage regulator causes the high potential voltage VSEN1 to fall by turning the low-side MOS transistor 197 ON (step S109).

After that, the procedure returns to step S104 and processing is repeated. FIG. 15 is a diagram exemplifying a stepwise schedule table according to the third embodiment.

In one example in FIG. 15, for a case where the current number of phases K is 8 and the number of phases after change M is 1, the table is defined to change the phases in five steps. It is defined that, in step 1 for which execution time is $\Delta T(1)$, the number of phases should remain at K and the amplification factor should be set to $\Delta T(1)$. It is defined that, in step 2 for which execution time is $\Delta T(2)$, the number of phases should remain at K and the amplification factor should be set to $\Delta T(2)$. It is defined that, in step 3 for which execution time is $\Delta T(3)$, the number of phases should change to M and the amplification factor should be set to $\Delta T(3)$. It is defined that, in step 4 for which execution time is $\Delta T(4)$, the number of phases should remain at M and the amplification factor should be set to $\Delta T(4)$. It is defined that, in step 5 for which execution time is $\Delta T(5)$, the number of phases should remain at M and the amplification factor should be set to $\Delta T(5)$.

FIG. 16 is a diagram for explaining how the amplification factor should change for the case where the current number of phases K is 8 and the number of phases after change M is 1. Here, it is assumed that $F(1)=8$, $F(2)=4$, $F(3)=4$, $F(4)=2$, and $F(5)=1$.

First, in step 1, the number of phases remains at K and the amplification factor becomes $\Delta T(1)$ (=8). In step 2, the number of phases remains at K and the amplification factor becomes $\Delta T(2)$ (=4).

In step 3, the number of phases changes to M and the amplification factor becomes $\Delta T(3)$ (=4). In step 4, the number of phases remains at M and the amplification factor becomes $\Delta T(4)$ (=2).

Figure 17:
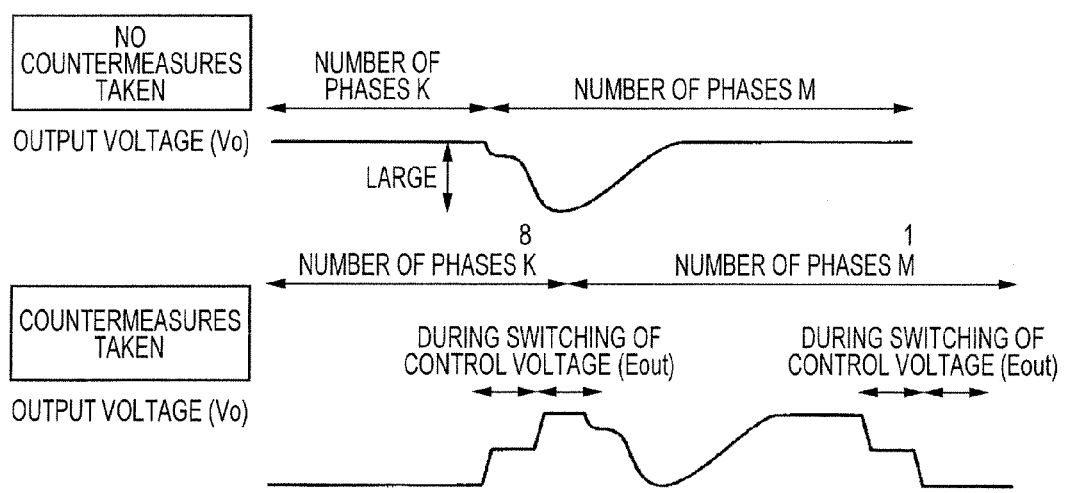
FIG. 17 is a diagram presenting an example of how the output voltage (Vo) of the regulator cluster 30 in the third embodiment will change.

In step 5, the number of phases remains at M and the amplification factor becomes ΔT(5) (=1). FIG. 17 is a diagram presenting an example of how the output voltage (Vo) of the regulator cluster 30 in the third embodiment will change.

As can be seen in FIG. 17, in a case where an amplification factor is not changed, when changing the number of phases, as heretofore practiced, the output voltage (Vo) abruptly changes and undershoot occurs.

In a case where an amplification factor is changed in a stepwise manner, when changing the number of phases, as implemented in the present embodiment, the output voltage (Vo) moderately changes and no undershoot occurs.

As above, according to the present embodiment, by stepwise switching of the amplification factor of the variable amplifier since before switching of the number of phases, it is possible to compensate for undershoot.

If step switching occurs in the middle of a PWM cycle, unbalanced switching of voltage regulators may occur and voltage may become hard to stabilize. In such a case, it is also possible to synchronize the execution time of each step (that is, step switching timing) with PWM cycle timing. Alternatively, switching timing for a part of multiple steps (a step in which the number of phases should change and/or a step in which an amplification factor should change) may be synchronized with the PWM cycle, whereas switching timing for other steps may follow setting in a stepwise schedule table.

Moreover, according to the present embodiment, even if there is a voltage variation found after designing a board is finished, such voltage variation can be coped with only by modifying firmware without a need to readjust a filter circuit outside the IC.

Modification Example

The present invention is not limited to the foregoing embodiments and comprehends a modification example as below.

(1) The functions of the first through third embodiments may be combined. In this case, the sequence table register should store stepwise schedule tables described for the first through third embodiments.

The embodiments disclosed herein are to be considered in all respects as illustrative and not restrictive. The scope of the present invention is indicated by the appended claims, rather than by the foregoing description, and all changes which come within the meaning and range of equivalency of the claims are therefore intended to be embraced therein.

What is claimed is:

1. A controller controlling a plurality of voltage regulators that supply a power supply voltage to a first semiconductor device, said controller comprising:
   an interface that receives a command which indicates the number of voltage regulators to be actuated from outside, and
   a control unit configured to change an output state of said controller from a current state to an intermediate state in accordance with said command and change said output state from the intermediate state to a destination state,
   where said control unit activates a current number of regulators in said current state, changes the number of the actuated regulators from said current number to said indicated number in a stepwise manner in said intermediate state, and activates said indicated number of said regulators in said destination state.

2. The controller according to claim 1, further comprising a register that stores schedules, each schedule specifying the number of voltage regulators for each of a plurality of steps for each of combinations of a number as the number of voltage regulators before change and a number as the number of voltage regulators after change,
   wherein said control unit makes a stepwise change of the number of voltage regulators to be actuated, according to a schedule stored in said register.

3. The controller according to claim 2,
   wherein said register further retains an execution time of each step, and
   wherein said control unit makes a stepwise change of the number of voltage regulators to be actuated, according to the execution time of each step specified in a schedule stored in said register.

4. The controller according to claim 1,
   wherein said control unit outputs phase clocks to voltage regulators to be actuated, wherein the phase clocks with different phases are supplied to the respective voltage regulators, and
   wherein said control unit synchronizes a cycle of the phase clocks being supplied to the voltage regulators with the execution time of at least one step specified in said schedule.

5. A controller controlling a plurality of voltage regulators that supply a power supply voltage to a first semiconductor device, said controller comprising:
   an interface that receives an indicated voltage and a command which indicates the number of voltage regulators to be actuated among said voltage regulators from outside; and
   a control unit that sets the indicated voltage as a target voltage and performs voltage control so that the supply voltage to said first semiconductor becomes equal to the target voltage, when not receiving said command to change the number of voltage regulators,
   wherein said control unit changes an output state of said controller from a current state to an intermediate state in accordance with said command and change said output state from the intermediate state to a destination state,
   wherein said control unit activates a current number of regulators in said current state, makes a stepwise change of the target voltage according to a schedule for making a stepwise change of an offset voltage that is added to the indicated voltage and performs voltage control so that the supply voltage to said first semiconductor device becomes equal to the target voltage in each step in said intermediate state, and activates said indicated number of said regulators in said destination state.

6. The controller according to claim 5, further comprising a register that stores the schedules, each schedule specifying the offset voltage for each of a plurality of steps for each of combinations of a number as the number of voltage regulators before change and a number as the number of voltage regulators after change,
   wherein said control unit makes a stepwise change of the offset voltage, according to a schedule stored in said register.

7. The controller according to claim 6,
   wherein said register further retains an execution time of each step, and
   wherein said control unit makes a stepwise change of the offset voltage, according to the execution time of each step specified in a schedule stored in said register.

8. The controller according to claim 5,
   wherein said control unit outputs phase clocks to voltage regulators to be actuated,
   wherein the phase clocks with different phases are supplied to the respective voltage regulators, and wherein said control unit synchronizes a cycle of the phase clocks being supplied to the voltage regulators with the execution time of at least one step specified in said schedule.

9. A controller controlling a plurality of voltage regulators that supply a power supply voltage to a first semiconductor device, said controller comprising:
- an interface that receives an indicated voltage and a command which indicates the number of voltage regulators to be actuated from outside; and
- a control unit that gives the voltage regulators a voltage corresponding to a difference between the indicated voltage and a current voltage being supplied to said first semiconductor device, when not receiving said command to change the number of voltage regulators,
- wherein said control unit changes an output state of said controller from a current state to an intermediate state in accordance with said command and change said output state from the intermediate state to a destination state,
- wherein said control unit activates a current number of regulators in said current state, makes a stepwise change of an amplification factor of the first voltage according to a schedule for making a stepwise change of the amplification factor of the first voltage and gives the voltage regulators a voltage corresponding to a difference between the indicated voltage and a voltage amplified by amplifying the first voltage by the amplification factor in each step in said intermediate state, and activates said indicated number of said regulators in said destination state.

10. The controller according to claim 9, further comprising a register that stores the schedules, each schedule specifying the amplification factor for each of a plurality of steps for each of combinations of a number as the number of voltage regulators before change and a number as the number of voltage regulators after change,
- wherein said control unit makes a stepwise change of the amplification factor, according to a schedule stored in said register.

11. The controller according to claim 10,
- wherein said register further retains an execution time of each step, and
- wherein said control unit makes a stepwise change of the amplification factor, according to the execution time of each step specified in a schedule stored in said register.

12. The controller according to claim 9,
- wherein said control unit outputs phase clocks to voltage regulators to be actuated, wherein the phase clocks with different phases are supplied to the respective voltage regulators, and
- wherein said control unit synchronizes a cycle of the phase clocks being supplied to the voltage regulators with the execution time of at least one step specified in said schedule.

* * * * *